Sept. 14, 1926.

L. MINTROP 1,599,538

GEOLOGICAL TESTING METHOD

Filed Dec. 13, 1920    2 Sheets-Sheet 1

INVENTOR
Ludger Mintrop
BY
His ATTORNEYS.

Sept. 14, 1926.
L. MINTROP
1,599,538
GEOLOGICAL TESTING METHOD
Filed Dec. 13, 1920   2 Sheets-Sheet 2
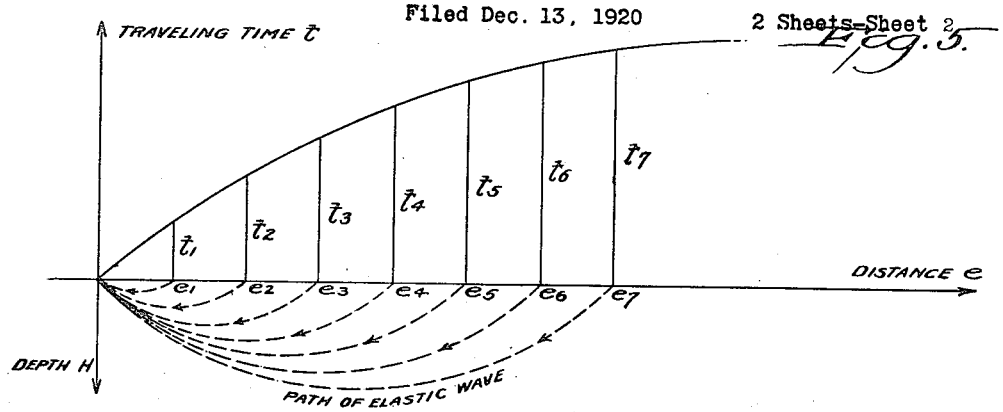
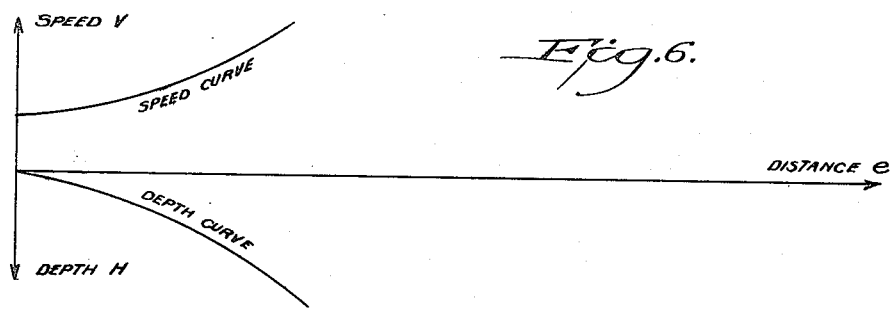
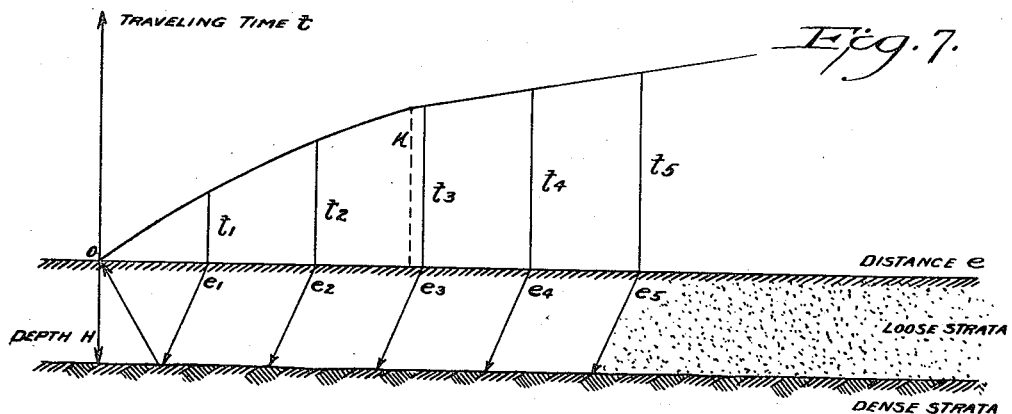
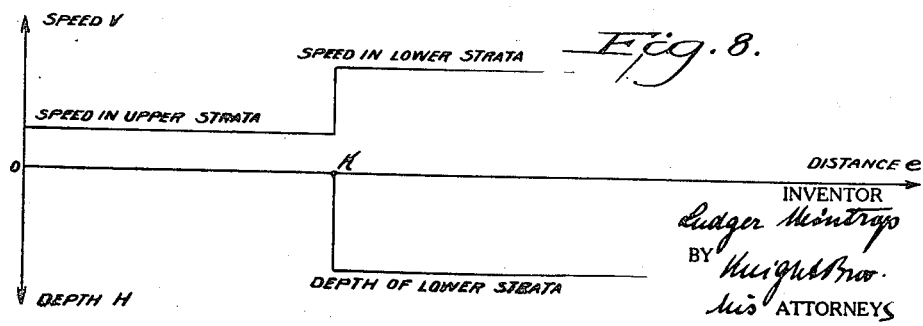
INVENTOR
Ludger Mintrop
BY Knight Bros.
his ATTORNEYS Patented Sept. 14, 1926.

1,599,538

UNITED STATES PATENT OFFICE.

LUDGER MINTROP, OF BOCHUM, GERMANY.

GEOLOGICAL TESTING METHOD.

Application filed December 13, 1920, Serial No. 430,432, and in Germany December 6, 1919.

(GRANTED UNDER THE PROVISIONS OF THE ACT OF MARCH 3, 1921, 41 STAT. L., 1313.)

My invention relates to a method of ascertaining the geological structure of the strata appertaining to a particular region such method being useful in particular for mining operations when developing a lode or opening a seam. Up till now in all those cases where the natural formation of the ground does not throw light upon the subject, recourse must be had to borings. However, the sinking of bore holes regularly constitutes a tedious and expensive operation which moreover cannot even be employed in all cases. Again, whenever it has been merely a question of primarily obtaining an idea of the approximate composition of the strata, the divining-rod has been, as may be well known, experimented with. Notwithstanding, as is well known to those skilled in the art, it has been so far impossible to establish an indisputable connection between the action of the divining rod and the geological peculiarities of the subsoil. A second method of working and serving the same end of securing merely approximate data, consists in the application of electric waves from the action of which certain definite inferences are then drawn as to the arrangement and the peculiar nature of the strata.

Now in accordance with my invention it is likewise intended that waves per se shall be employed for the purpose of ascertaining the arrangement of the strata, however, not electric waves but elastic waves, produced by mechanical means. I employ these waves in appreciation of the fact that the connection of such mechanically generated waves with the properties of the strata, such as density and elasticity, will be far more direct and therewith far more intimate than the correlation to electric waves. To this end, there are generated in accordance with my invention within the measuring area and at a suitable point thereof, artificial mechanical waves, say, for instance, by the detonation of a certain quantity of explosives, the elastic propagation of these mechanical waves through the different beds being recorded by a seismograph set up at a suitable distance remote therefrom. The records thus obtained are then made use of in exactly the same manner customary in seismology for the purpose of setting up the so-called "travelling time curve" and in order to compute the velocity of the waves at the various depths. I am aware that in seismology, attempts have already been made to arrive at certain conclusions relatively to the general geological formation of the earth as a whole.

For general information on this comparatively recent art reference is made, especially with regard to the use of "traveling time curves" or sometimes shortly called "time curves", to "Modern Seismology" by G. W. Walker, published in 1913 by Longmans, Green & Company, New York and London, where on page 53 and following, the function and use of traveling time curves in seismology is dealt with in detail. For the present purposes the use of these curves will be shortly explained hereinafter.

Thus far, however, the investigators were able by such observations to only draw approximate and general conclusions as to the structure of the entire earth, and at that with observations based only on accidental natural earth shocks of uncontrollable duration and origin.

On the other hand, in the present instance, the noteworthy feature is that the observations to be effected does not rely upon the uncertain occurrence of natural earthquakes, but that there are produced, purposely and by special means, artificial earth shocks, in consequence of which alone the possibility is created of carrying out observations of this character for a particular locality and for a definite period of time. Of essential importance in this connection is moreover the fact that by means of my improved method there is now also provided a convenient form of comparative measurement for the purpose of determining the propagation of the elastic waves within the strata and of their time of arrival at the seismometer, respectively, by employing, for the purpose of ascertaining the moment when the elastic oscillations are excited, either the sound waves created in any case on the detonation of the explosive charge, or else by effecting a transmission by means of light, electric current or electric waves, respectively.

From the surface speed and the three dimensional speed of the waves, as also from the depths down to which the waves have penetrated the strata, but in particular, from the mutual relation of the velocities of the longitudinal and transversal waves, inferences may be drawn respecting the elastic properties of the strata traversed by the waves. It will thus be found that especially from the points of inflection and the bends in the "travelling time curve", there may always be inferred that there exist fissures in the elastic properties of the strata, as also inflections, refractions, and reflections at the marginal levels thereof.

The manner in which my novel method is employed is illustrated in the accompanying diagrams in which:

Figure 1 diagrammatically represents the set-up of the apparatus preparatory to making the observation;

Figure 5 represents a bent traveling time curve as a resultant of increasing density of the ground under observation;

Figure 6 represents a velocity and a depth curve obtained from the traveling time curve in Figure 5;

Figure 7 represents diagrammatically a traveling time curve with bends in it as a result of a sudden change in the character of the underlying strata; and Figure 8 represents the velocity and depth curves obtained from the observations plotted in the traveling time curve Figure 7.

Figure 1:
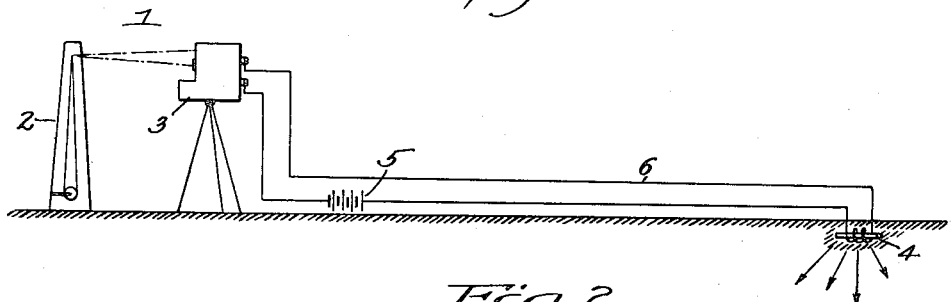

Referring to Figure 1, 1 represents a recording field seismograph for the purposes of the present invention and of a construction and character described and illustrated in my U. S. Patent No. 1,451,080, dated April 10th, 1923. The recording seismograph shown in Figure 6 of that patent consists of a pendulum device and a photographic recorder, both of which instrumentalities may be assumed to cooperate in the present case as described in the aforementioned patent, the pendulum device being denoted in the present Figure 1 with 2 and the photographic recording device being diagrammatically indicated at 3. At a suitable distance from the seismograph 1 a cartridge 4 filled with suitable explosives is located and an electric circuit 6 is established between the cartridge and the recording device 3, including the battery 5, of such character that when the cartridge is exploded the circuit is interrupted and thus, by suitable means described in the aforementioned patent, a mark 9 is made on the recording tape illustrated in present Figure 2.

Figure 2:
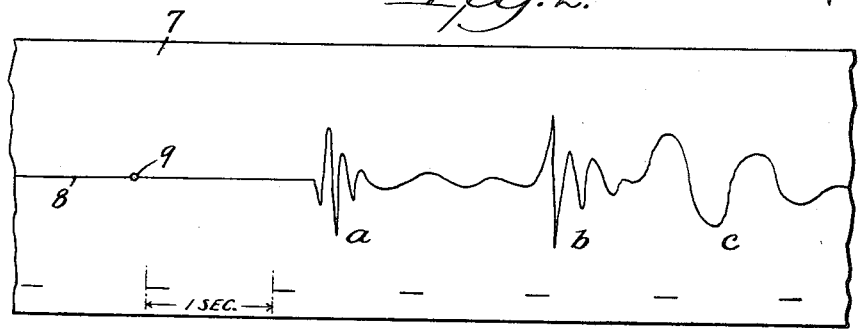
Figure 2 represents a portion of the recording tape on which an observation of the artificially produced earth shock and its traveling time has been recorded.

Referring to Figure 2 a tape portion is shown at 7 and assumed to continuously travel at a certain rate of speed, means being provided in the recording apparatus to make recording marks at stated equal time intervals, for instance in seconds, as shown at the lower tape edge in Figure 2. So long as no shocks arrive at the seismograph a straight central line 8 is recorded on the tape by the means provided in the aforementioned apparatus. As soon as a shock disturbs the equilibrium of the seismograph pendulum, the mirror of the instrument oscillates and instead of making a straight line record on the tape, oscillations such as are shown at $a$ or $b$ or $c$ are recorded.

By other suitable means shown and described in aforementioned patent, the interruption of the circuit 6 on the explosion of the cartridge records the vertical mark 9, above referred to, on the tape shown in present Figure 2. The time which has elapsed between the initial mark 9 and the appearance of the first oscillation $a$ is called the "traveling time" of the elastic wave. A number of separate subsequent waves or oscillations are generally recorded on the tape due to the same explosion or shock. The first oscillations $a$ are due to the elastic waves traveling through the ground, the second oscillation $b$ are air waves and the third oscillations $c$ are usually due to very long ground waves.

For the present explanation it is sufficient to receive the first sharply defined short ground waves noted by the oscillations $a$. The traveling time $t$ thus recorded constitutes the time which these waves consumed in traveling from the point of origin to the seismograph.

Figure 3:
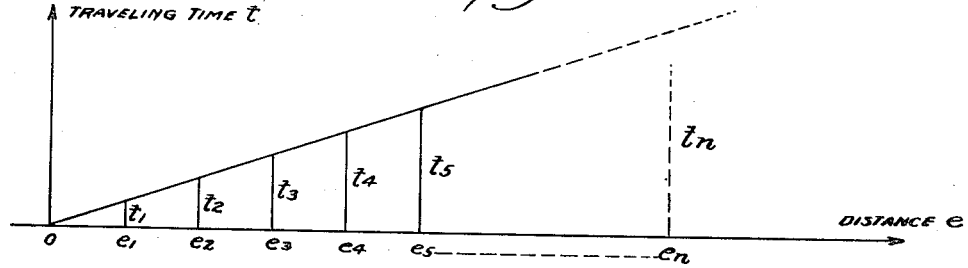
Figure 3 is a straight line traveling time curve composed from a plurality of individual observations such as are recorded on the tape shown in Figure 2.

This time will be the greater the further the seismograph is removed from the origin of the shock. Thus if the recording apparatus be assumed to remain stationary in one certain place and if successively a number of cartridges are exploded along a straight line further away from the seismograph, but at equal distances from each other, the traveling time increases in homogeneous ground proportionate to these distances. Such a straight line traveling time curve is shown in Figure 3 in which the ordinates represent the traveling times $t$ and the abscissæ represent the distances $e$ from the seismograph, at which the shocks have been produced. In the example given the shocks are produced at the distances $e_1, e_2, e_3$ ** $e_n$, and accordingly the values of the traveling times $t_1$, $t_2, t_3$ ** $t_n$ have been observed at the seismograph, the soil conditions in the present example being assumed to be of such character that a straight line traveling time graph is obtained. From the measured distances and the observed traveling times the speeds of velocities of the wave for the different distances are obtained as:

$$v_1 = \frac{e_1}{t_1}; \ v_2 = \frac{e_2}{t_2}; \ v_3 = \frac{e_3}{t_3}; \ **** \ v_n = \frac{e_n}{t_n}$$

Being assumed that:

$$\frac{e_1}{t_1} = \frac{e_2}{t_2} = \frac{e_3}{t_3} \ **** = \frac{e_n}{t_n}$$

It follows that:

$$v_1 = v_2 = v_3 \ **** = v_n$$

Figure 4:
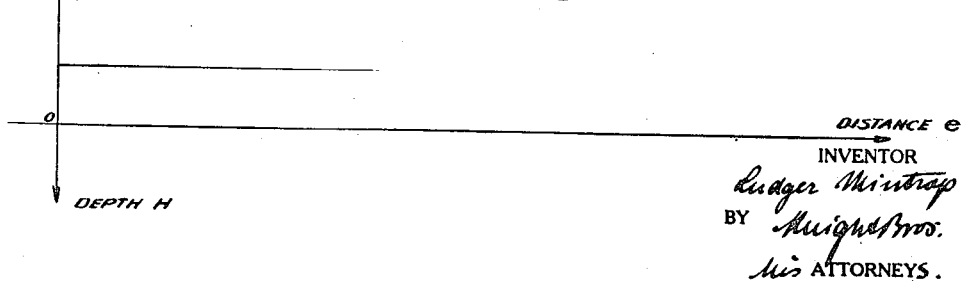
Figure 4 represents a straight line velocity curve resulting from the traveling time curve in Figure 3.

In other words, the speed of the waves is constant, and therefore, this explains why the traveling time curve is a straight line. Thus in the graph shown in Figure 4 in which the speed of the waves is plotted against the increasing distances $e$, the speed curve is a straight line in parallel to abscissæ line of the graph. Since the speed curve shows a constant speed, the corresponding depth curve would also show a constant depth and would accordingly be represented as a straight line coinciding with the abscissæ line, which shows that the depth is zero. In other words, this indicates that the waves have traveled along the surface of the ground in the example assumed in Figures 3 and 4.

In Figures 5 and 6 are illustrated graphs which more closely resemble actual observations, even though it is assumed in this example, that only one strata is observed. The observations represented in Figure 5 are again assumed to have been made with shocks produced at different distances $e_1$, $e_2$ **** $e_n$ from the point of observation. It will be noted, however, from the uniformly curved character of the traveling time curve that the traveling time does not increase proportionately with the distance. In this graph the approximate paths of the elastic waves are indicated by lines provided with arrows, and it will be noted that the deeper the shocks penetrate into the ground the shorter becomes their traveling time, i. e., the more their speed increases. The corresponding traveling speed curve is shown in Figure 6. Such an increase in speed with increase in distance between the point of shock origin and the point of observation would be caused for instance in sandy soil by the fact that quite naturally the sand is comparatively loose at and near the surface, whereas it increases in density with the depth owing to the increased pressure of the upper layers of sand. Thus the curved paths of the elastic waves shown in Figure 5 are produced, penetrating deeper and deeper into the ground as the distance is increased, whereas in Figure 4, which assumes theoretically uniformly loose soil, the shocks would only travel along the surface of the ground. It thus follows that the traveling time curve will be curved the more, the more the density of the sub-surface increases, in other words, the more the traveling speed of the waves increases with the depth.

Inversely a definite increase in speed observed corresponds with a definite increase in depth which the traveling waves have attained on their way from the point of origin to the point of observation. Figure 6 illustrates the depth curve corresponding with the speed curve plotted from the observations. The different speeds observed at the different distances are easily calculated from the traveling time curve originally obtained from the observations and shown in Figure 5 as follows:

$$v_1 = \frac{e_1}{t_1}; \ v_2 = \frac{e_2 - e_1}{t_2 - t_1}; \ **** \ v_n = \frac{e_n - e_{n-1}}{t_n - t_{n-1}}$$

or $$v_1 = \frac{\Delta e_1}{\Delta t_1}; \ v_2 = \frac{\Delta e_2}{\Delta t}; \ **** \ v_n = \frac{\Delta e_n}{\Delta t_n}$$

In the examples represented by the combined graph and subsoil diagram Figure 7 and the graph Figure 8, the case is assumed that a strata of considerable density, for instance lime stone, underlies a comparatively soft upper strata, for instance loose sand. When observations are made in such a case the traveling speeds, instead of gradually and uniformly increasing with the distance as shown in Figure 5, increase abruptly from the point at which the elastic waves, heretofore traveling in loose sand, enter the dense lime stone. At such a point the traveling time curve suddenly shows a sharp bend (at $k$ in Figure 7). While thus the speed derived from the first part of the curve shows the traveling speed in the upper loose strata, the portion of the curve following the bend gives an indication of the propagation speed in the lower denser strata. Such observations result then in a speed curve as shown in Figure 8 which shows a sudden increase in speed when the waves enter the denser strata, and correspondingly the depth curve assumes a sudden downward path at this point.

These simple examples given, plainly demonstrate that by thus observing on the surface of the ground the varying speeds of the elastic waves in underlying strata, the desired information as to the condition of the subsoil may be ascertained without physically examining the different strata, such for instance as by bore holes. Such seismic observations give the very definite information that a certain depth a strata of different character underlies the strata visible at the surface. As explained hereinbefore, the character of such an underlying strata, whether dense or loose, is ascertained from the traveling speed, obtained indirectly from the traveling time curve, since the speed is the greater the greater the density of the strata. For instance lime stone propagates elastic waves at a much greater speed than sand stone and in turn, sand stone propagates at a much greater speed than for instance clay.

In turn, the foregoing clearly shows that thus also the depth of the strata can be indirectly ascertained from the observed traveling time curve.

For example, referring to Figures 7 and 8, let $v_1$ and $v_2$ represent respectively the speeds of the elastic waves in the upper and in the lower strata and let $k$ be the distance of the bend in the traveling time curve from the starting point of the traveling time curve (O), then the depth H of the lower strata is calculated from the equation:

$$H = \frac{v_1}{v_2} \cdot k \cdot c$$

wherein $c$ represents a function depending upon the relation $\frac{v_1}{v_2}$ and which is known to all those skilled from the well known mathematical development of the earthquake theories.

For instance if $v_1$ is calculated from the observation as $=1000$ m/sec; $v_2=2500$ m/sec, and thus $$\frac{v_1}{v_2} = 0.4$$

the value of $c$ would be calculated as 0.32 according to well known formulæ. If now the point $k$ at which the traveling time curve bends is measured as 100 meters, the depth of the denser strata would be 32 meters.

For general information to those skilled in the art attention has already been called hereinbefore to the book entitled "Modern Seismalogy" by G. W. Walker, which contains all information necessary to make the required calculations referred to hereinbefore, the present method being a novel embodiment and novel practical use of the seismic theories earlier developed.

However, the factor $c$ may in practice also be determined emperically by recording traveling time curves in a territory which has been completely explored as to its geological character by actual drilling operations. Such emperical methods would obviate making use of many of the formulæ used in natural seismological observations and calculations.

Observations of the above mentioned character also enable the ascertaining of the presence of a number of different layers of different density. In the same manner as explained hereinbefore the character and depth of the individual layers may be ascertained by observing the different bends in the traveling time curve.

Even though by these means it will not in all cases be always possible to exactly determine the particular species of mineral per se, yet it will in general suffice to ascertain to what depth the strata visibly appearing on the surface extend and what is the thickness of the more solid or looser layers following thereunder, respectively, whether the manner in which the layers succeed each other corresponds to the normal geological formation of the region or not. This point is of paramount importance in filling—in geological maps or when it becomes a question of fixing the spots in a certain region where bore-holes and shafts are to be sunk. Then again, for instance, deposits of lignite and rock-salt evince such a characteristic elastic reaction that deposits of this nature may be directly ascertained—while making due use of other observations—by means of my improved method. At the same time, the said improved method itself is extraordinarily cheap and simple, since only a few pounds of explosives are all that is required for each observation, while the seismometer employed in connection therewith is so constructed as to constitute a simple, light and handy instrument. Besides, the persons required to carry out the field operations need by no means be scientifically trained, as the computation of the results obtained by the observations may be carried out along scientific lines subsequently. In this manner the sub-surface conditions of several square miles of territory may be ascertained in a few weeks, in other words, at an extremely small fraction of time and cost required for the sinking of a single bore hole. The improved method may also be made use of, when sinking shafts in quicksand, by means of the freezing process, thus enabling the observers to ascertain to what extent the soil has already become solidly frozen.

In the place of the seismometer proper, which mechanically indicates the shocks produced and records them by the aid of a heliograph, use may likewise be made of a microphone adapted to render the shocks audible by means of an electric current in a telephone or in a galvanometer. This is based on an appreciation of the fact that, according to the elastic properties of the subsoil, the pitch of the waves produced by artificial shocks will vary, for instance more nearly resembling a "ring" than a "thud" in which case frequently characteristic accessory sounds will in addition make themselves heard. By comparison with the data obtained by means of a seismograph, or by direct reference to spots the geological structure of which is known, the true inferences may then be drawn.

To this end, acoustic appliances known as terrestrial listening devices and which have been widely employed during the late war for the purpose of determining mining operations on the part of the enemy, may be directly made use of, since devices of this kind are already suitably designed or else may be easily adapted to the purpose had in view. It will thus be understood that in the place of the pendulum use is made of a microphone, placed face down on the ground or slightly buried therein, and, instead of a photographic recorder, a telephone or galvanometer or the like is employed. I may however also record the "travelling time curve" by photographically recording the fluctuations of current arising within the microphone by means of an oscillograph or a like apparatus, the telephone being merely employed for the reception by sound. The use of a microphone further permits of ascertaining the moment at which the artificial concussions take place. By employing a microphone influenced both by the terrestrial and by the air waves one obtains two marks, one succeeding the other, in the curve recorded and which allow of easily computing the said moment. I may however also employ two separate microphones, one for the terrestrial and one for the air sounds and connect them with the oscillograph or the photographic recorder.

A device of this sort is fully equivalent, as far as accuracy of measurement is concerned, to the seismographic apparatus, but exceeds this latter in point of simplicity and light weight.

The methods hereinbefore described may however also be employed in combination, the acoustic receiver being for intance made use of in carrying out certain preliminary tests furnishing general data as to the geological character of a region, whereupon more exact special investigations are carried out with the aid of the seismometer.

I claim:

1. The method of ascertaining geological tectonic formations which comprises generating artificial seismic waves so as to cause them to be transmitted through the ground from a point selected at will and detecting the characteristics of said waves at a determinable distance from said point.

2. The method of ascertaining geological tectonic formations comprising generating artificial seismic waves so as to cause them to be transmitted through the ground from a point selected at will, detecting the characteristics of said waves and from said detected characteristics determining subsurface strata.

3. The method of ascertaining geological tectonic formations which comprises causing an explosive charge to detonate substantially at the surface of the earth so as to transmit artifically generated seismic waves through the ground from a point selected at will and detecting the characteristics of said waves.

4. The method of ascertaining geological tectonic formations which comprises generating artificial seismic waves so as to cause them to be transmitted through the ground from a point selected at will and ascertaining the travelling speed of said waves by observations at several distances from said point.

5. The method of ascertaining geological tectonic formations which comprises generating from a point selected at will and substantially at the surface of the earth artificial seismic waves through the ground and ascertaining the travelling speed of said waves so as to cause them to be transmitted by means of a seismograph set up at a distance from said point.

6. The method of ascertaining geological formations which comprises causing an explosive charge to detonate at a point substantially at the surface of the earth so as to transmit seismic waves through the ground and ascertaining the travelling speed of said waves by means of a seismograph set up at a distance from said generating point.

7. The method of ascertaining geological formations which comprises causing an explosive charge to detonate at a point substantially at the surface of the earth so as to transmit seismic waves through the ground and receiving at a measurable distance from said point those seismic waves which precede the sound waves due to said detonation.

8. The method of ascertaining geological formations which comprises causing an explosive charge to detonate so as to transmit seismic waves through the ground from a point selected at will and detecting the characteristics of said seismic waves as well as of the sound waves generated by said detonation.

9. The method of ascertaining geological formations which comprises causing an explosive charge to detonate so as to transmit seismic and sound waves through the ground from a point selected at will and detecting the characteristics of said seismic waves as well as of the sound waves generated in the ground by said detonation.

10. The method of ascertaining geological formations which comprises causing an explosive charge to detonate so as to transmit seismic and sound waves through the ground from a point selected at will and ascertaining the travelling speed of said seismic waves as well as the character of the sound waves generated in the ground by said detonation.

11. The method of determining subsurface strata which comprises generating artificial seismic waves so as to cause them to be transmitted through the ground from a point selected at will and ascertaining the travelling speed of said waves in the different underground beds.

12. The method of determining subsurface strata which comprises generating artificial seismic waves so as to cause them to be transmitted through the ground from a point selected at will and ascertaining the travelling speeds of said waves in the different underground beds by noting the distance between the generating point and the point of observation and by observing the running time of said waves between said points.

13. The method of determining subsurface strata which comprises generating artificial seismic waves so as to cause them to be transmitted through the ground and observing the travelling speed of said waves for a plurality of known distances of travel measured at the surface.

14. The method of determining subsurface strata which comprises generating artificial seismic waves so as to cause them to be transmitted through the ground and observing the travelling speed of said waves over graduated known distances of travel measured at the surface.

15. The method of determining subsurface strata which comprises causing a plurality of explosive charges to detonate so as to transmit artificial seismic waves through the ground from points selected at will at a plurality of distances from the detecting point and ascertaining the travelling speed of said waves by recording the running times of said waves on a seismograph at detecting point.

16. The method of determining the depth of subsurface strata which comprises causing an explosive charge to detonate so as to transmit artificial seismic waves through the ground from a point selected at will and ascertaining the running time and the travelling speed of said waves by recording on a seismograph.

In testimony whereof I affix my signature.

Dr. LUDGER MINTROP.

CERTIFICATE OF CORRECTION.

Patent No. 1,599,538. September 14, 1926.

LUDGER MINTROP.

It is hereby certified that error appears in the printed specification of the above numbered patent requiring correction as follows: Page 5, second column, line 87, claim 5, strike out the words "so as to cause them to be transmitted" and insert the same after "waves" in line 85, same claim; and that the said Letters Patent should be read with this correction therein that the same may conform to the record of the case in the Patent Office.

Signed and sealed this 31st day of May, A. D. 1938.

(Seal)

Henry Van Arsdale,
Acting Commissioner of Patents.